Oct. 17, 1967  K. STRUBIN  3,347,574
CONNECTING ARRANGEMENT FOR FURNITURE PANELS AND THE LIKE
Filed Aug. 10, 1964                                    3 Sheets-Sheet 1
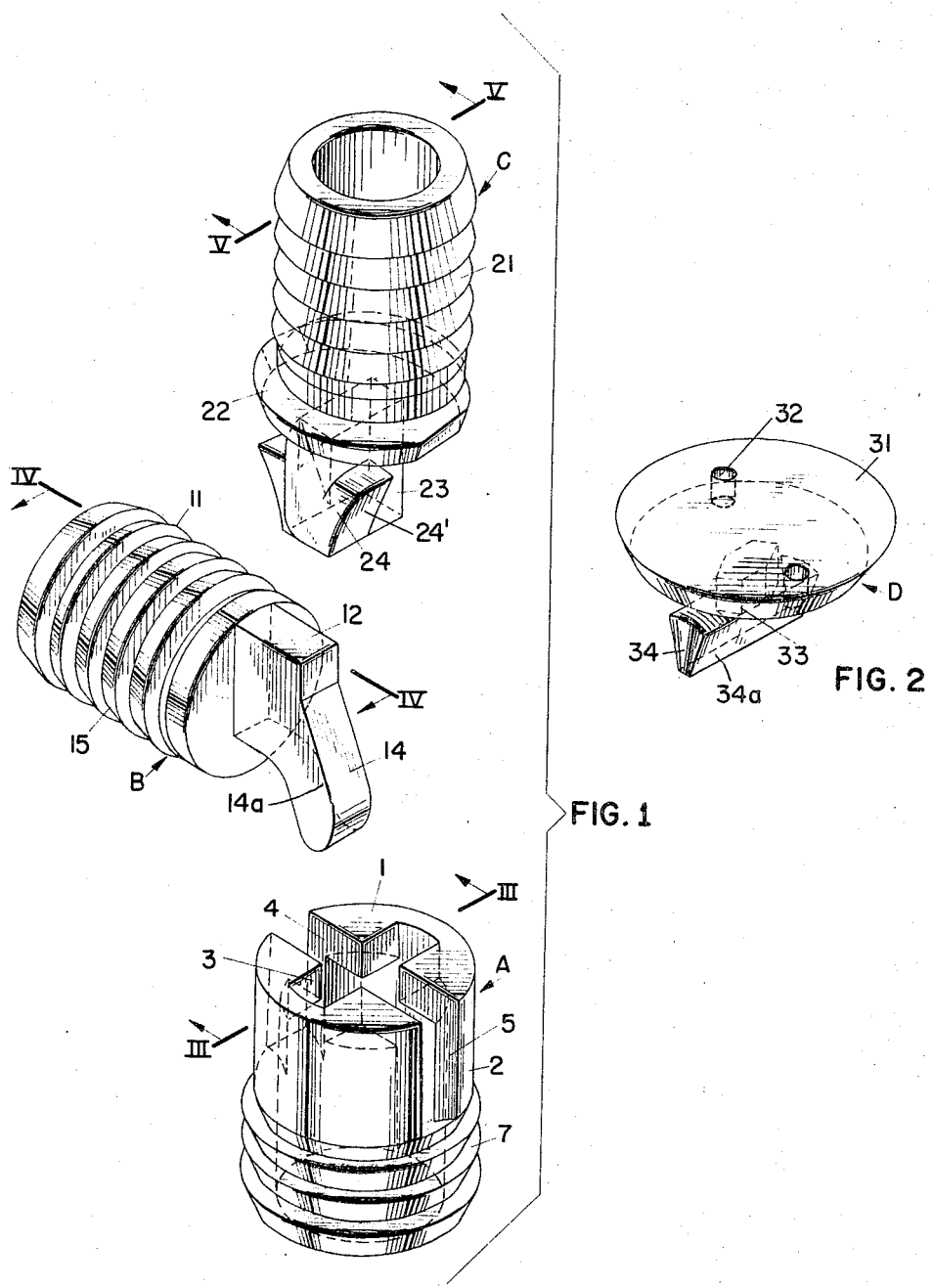
INVENTOR
KLAUS STRÜBIN United States Patent Office 3,347,574
Patented Oct. 17, 1967

3,347,574
CONNECTING ARRANGEMENT FOR FURNITURE PANELS AND THE LIKE
Klaus Strübin, 5 Hebelstrasse,
783 Emmendingen, Germany
Filed Aug. 10, 1964, Ser. No. 388,513
Claims priority, application Germany, Feb. 11, 1964,
St 16,885
6 Claims. (Cl. 287—20.92)

This invention relates to the assembly of furniture panels and similar structural elements, and particularly to a system of connecting elements for quickly assembling furniture elements substantially without tools.

It is known to ship furniture panels and similar furniture elements in knocked-down condition for assembly at destination. Substantial savings in packing and forwarding cost result from this shipping method. The invention is concerned with the rapid assembly of such furniture elements to a finished product meeting high standards of quality. A more specific object of the invention is the provision of connecting elements which can be produced inexpensively to exacting tolerances, installed on furniture elements with high precision by means of simple equipment, and then interengaged substantially without the use of tools in the assembly of the finished piece of furniture.

Another object is the provision of connecting elements which are universally employable, and not limited to furniture elements of specific size or shape.

With these and other objects in view, the invention, in one of its aspects, contemplates the use of a basic connecting element consisting of a tubular member equipped with a radial end wall which axially bounds one end of the cavity in the tubular member. The end wall is formed with an opening therethrough, and has inner and outer faces adjacent the opening transverse of the axis of the tubular member. An axial slot in the tubular member communicates with the opening in the end wall.

Other features and many of the attendant advantages of this invention will be readily appreciated as the same becomes better understood by reference to the following detailed description when considered in connection with the accompanying drawing wherein:

FIG. 1 shows a ternary connection of the invention in an exploded perspective view;

FIG. 2 shows a cover element for connecting element A of the invention in a perspective view;

Figure 3:
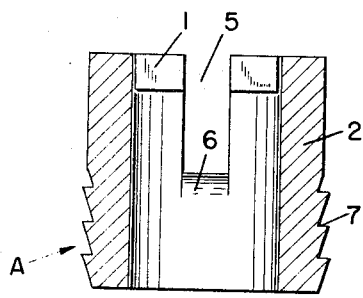
FIG. 3 shows connecting element A of the connection of FIG. 1 in elevational section on the line III—III.

Referring now to the drawing in detail, and initially to FIG. 1, there are seen the three elements A, B, C, of a ternary connection of the invention. The element A, also shown in FIG. 3, is a tubular member having a generally cylindrical wall 2 and a radial end wall 1 which partly closes the cylindrical cavity within the member A at one axial end thereof.

Two elongated, perpendicular diametrical slots 3, 4 in the end wall 1 bisect each other in the center of the end wall. The shorter slot 3 has a length equal to the internal diameter of the cylindrical cavity, and the transverse end walls of the slot 3 are curved and axially aligned with corresponding portions of the inner surface of the wall 2.

The longer slot 4 extends across the entire width of the end wall 1, and two axial slots 5 of equal width extend from the ends of the slot 4 into the longitudinal wall 2. The transverse end wall 6 of each slot 5 arcuately slopes inward of the member A and away from the end wall 1.

The outer face of the wall 2 between the slots 5 and the opening end of the member A carries three axially spaced annular ribs 7. Each rib has one flank which extends in a radial plane, and another flank which slopes obliquely in a radially inward direction and toward the open end of the element A.

Figure 4:
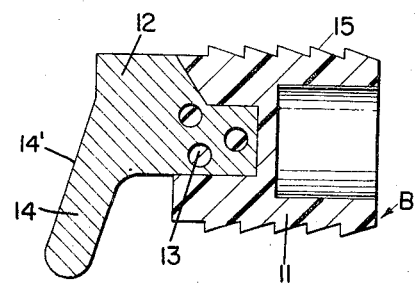
FIG. 4 shows connecting element B in section on the line IV—IV of FIG. 1.

The element B, seen in section in FIG. 4, consists of a generally cup-shaped and cylindrical plastic body 11 and of a metal insert 12 one end of which is integrally anchored in the plastic body by openings 13 in the insert 12 penetrated by the plastic. The free end 14 of the metal insert is hook-shaped and has an oblique face 14' bounded by oblique edges 14a. The plastic body 11 has integral external ribs 15 closely similar to the ribs 7.

The dimensions and the configuration of the metal insert 12 are such that two identical elements B may be inserted into the element A through the slot 4 and respective slots 5 until, the free ends 14 conformingly engage the arcuately sloping transverse walls 6, the top edges of the inserts are flush with the radial end wall 1, the slot 3 is clear of obstructions, the two branches of the slot 4 on either side of the slot 3 are partly occupied by the inserts 12, and the two free ends 14 abuttingly engage each other in the cavity of the member A.

Figure 5:
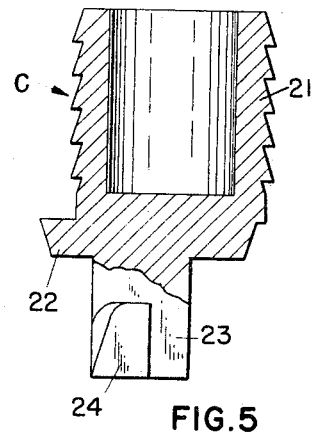
FIG. 5 shows the third element C of the connection of FIG. 1 partly in side elevation, and partly in side-elevational section on the line V—V.

The third connecting element C is shown in FIGS. 1 and 5. It is a unitary metal body having a generally cylindrical, externally ribbed, cup-shaped portion 21 whose closed end is integrally joined to the larger circular face of a frustoconical plate 22 in such a manner that the axes of the cylindrical portion 21 and of the plate 22 are parallel but radially offset. A flat bar portion 23 axially extends from the smaller circular face of the plate 22 and is approximately centered on the plate.

Two wings 24 laterally project in opposite directions from an axial edge of the bar 23, and are spaced from the smaller face of the plate 22 a distance approximately equal to the thickness of the end wall 1. The outer edges of the wings 24 opposite the plate 22 are rounded off. The dimensions of the bar 23 and of the wings 24 are such that the bar may be axially introduced into the slot 3 of the member A, and the wings may be simultaneously passed through the slot 4 between two inserts 12, with the bevelled end faces 24' sliding by oblique faces 14' of the hook-shaped portion of the inserts. The length of the slot 3 is greater than the corresponding dimension of the bar 23.

Figure 6:
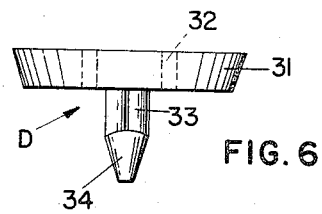
FIG. 6 is a side elevational view of the cover element of FIG. 2.

The cover element D shown in FIGS. 2 and 6 is a unitary metal structure consisting of a frustoconical plate 31 substantially identical with the plate 22, and cross bar 34 connected to the plate 31 by a stem whose length is about equal to the thickness of the radial end wall 1. The cross bar 34 has rounded longitudinal end faces 34a and a rounded face opposite the plate 31. The cross section of the stem 33 is a hexagon having two axes of symmetry. Two axial bores 32 are provided in the plate 31 and are spaced from the center of the plate in diametrically opposite directions.

The dimensions of the cover element are such that the cross bar 34 may be inserted in the slot 3 of the element A until the plate 31 abuts against the end wall 1 while two inserts 12 are respectively received in the axial slots 5.

Figure 7:
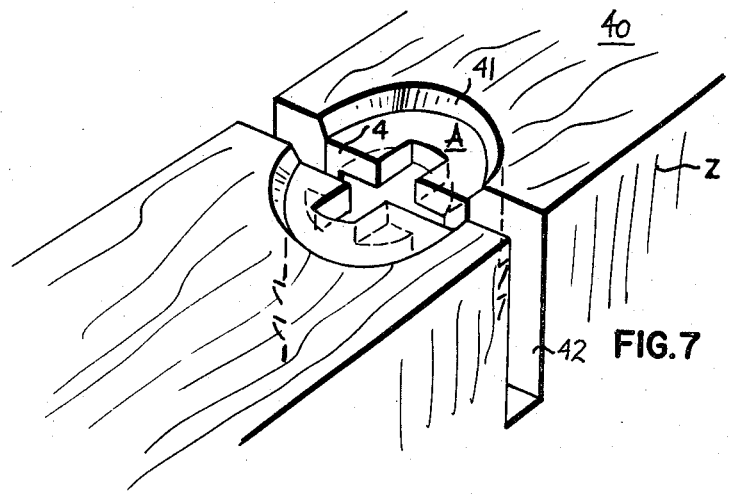
FIGS. 7 to 9 illustrate the connecting operation.

The connecting elements A, B and C, and the cover element D of the invention may be employed for connecting wooden panels and similar furniture parts in the following manner:

A hole is drilled into a narrow edge face 40 of a first panel Z (see FIG. 7) at right angles to the face, the diameter of the hole being approximately equal to the diameter of the longitudinal wall 2 at the root of the ribs 7. The orifice 41 of the hole is enlarged to conform to the plates 22 and 31. The edge of the panel is slotted at 42 at right angles to the top and bottom faces and through the axis of the drilled hole to a depth equal to the combined thickness of the plates 22 or 31 and the length of the slot 5.

An element A is then driven into the hole until the outer face of the wall 1 forms the bottom of the enlarged orifice 41, and the slots 5 are aligned with the slots 42 in the panel. Similar holes are drilled in edge faces of other panels, and elements B and C are inserted therein (see FIG. 9).

The several connecting elements are retained in the respective holes by the barb-like action of the ribs on the cylindrical outer faces of the elements in a manner well known in itself. The anchorage of the connecting elements in the associated bores may be strengthened by inserting a conforming dowel pin in the cylindrical cavity of each element in such a manner that a portion of the pin projects from the open end of the element, and by gluing the pin to the panel at the bottom of the drilled hole.

For a binary connection between two panels at right angles to each other, the element B of one panel is inserted in the element A of the other panel until the free hook end 14 is conformingly seated on the transverse wall 6 of the associated slot 5. The connection of the elements A and B is then locked by a cover element D whose cross bar 34 is inserted through the shorter slot 3 in the end wall 1.

A wrench, not illustrated, consisting of a straight bar carrying two short, longitudinally spaced, transverse pins matching the bores 32 in the plate 31 is employed for turning the locking element D about 45° about its axis until the face 34a of the transverse bar 34 engages the obliquely inclined edge 14a of the face 14' of the free end 14 on the element B, and is firmly wedged between the inner face of the end wall 1 and the insert 12, thereby locking the elements A and B to each other and securing the relative position of the two connected panels. The plate 31 is received in the enlarged orifice of the first mentioned panel flush with the edge face of the same.

Figure 8:
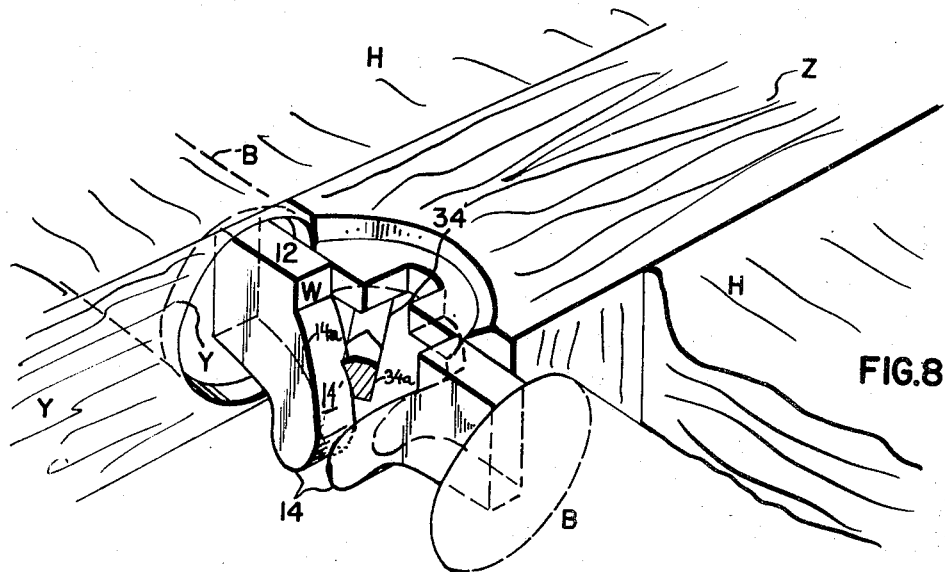

As shown in FIG. 8, a ternary connection between one panel Z carrying an element A and two panels H, H equipped with respective connecting elements B may be established by inserting the two hook-shaped ends 14 of inserts 12 through axial slots 5, 5, with the perpendicular faces W of the inserts flush with the cavity wall of element A, and the three panels are then locked to each other by a cover element D by inserting cross bar 34 of element D (not shown in FIG. 8 for the sake of clarity) through diametrical slot 3 of element A, with the underface of plate 31 abuttingly engaging the outer face of the circular end wall of element A. Element D is then turned about 45° (with a wrench engaging holes 32, for instance) until the face 34a of the cross bar engages the edge 14a of the hook-shaped end 14. This locks the inserts 12 into position. A panel arrangement that may be assembled in this manner has two panels in a common plane with the edge of a third perpendicular panel interposed between the two panels.

Use of single connecting elements A, B, C, provides a ternary panel connection in which two panels abuttingly engage each other edge to edge in common plane while another panel extends at right angles from the abutting edges of the two other panels. Connecting elements A and B are inserted in holes drilled in respective edge faces of panels, and the two panels are connected at right angles to form a binary connection as described hereinabove.

A hole drilled in the edge of the third panel receives the element C to such a depth that the exposed part of the larger circular face of the plate 22 abuts against the edge face of the panel, and the plate 22, the bar 23, and the wings 24 project from the panel. The bar 23 is inserted in the shorter slot 3 in the end wall 1 of the element A until the wings 24 clear the slot 4. The bar 23 is then moved longitudinally of the slot 3 whereby the wings 24 engage the inner face of the wall 1 on either side of the slot 3, while the free end face of the bar 23 engages the hook shaped free end 14 of the element B, thereby locking the three connected panels to each other.

Figure 9:
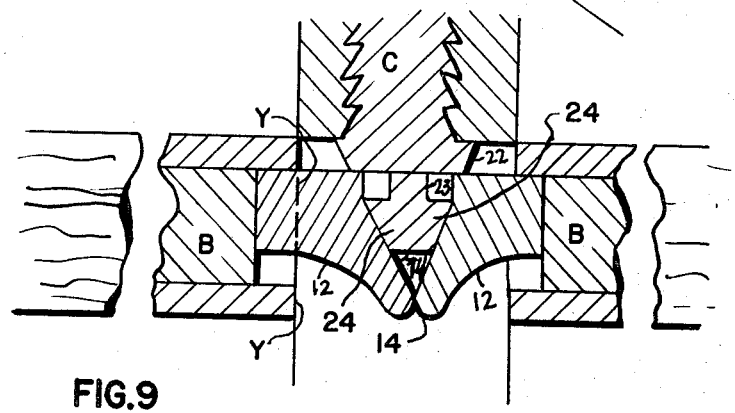

A quaternary connection of four panels by means of an element A, and element C, and two elements B may be established in a manner evident from the preceding paragraph. As shown in FIG. 9, element C is inserted into element A by sliding the bar 23 through slot 3, with the wings 24 sliding through slot 4, after elements B have been inserted in element A in the above-described manner, with end faces Y of panels H, H, engaging the side walls of panel Z. The element C is then moved radially until the wings engage the inner face of the end wall of element A, the bevelled sides 24' of the wings sliding by the oblique sides 14' of the hook-shaped ends 14 of elements B. The hooks are locked into position by the engagement of the underside of plate 22 of element C with the flat upper side of inserts 12, the quaternary assembly being further held in position by the engagement of the side walls Y of panels H, H with the side wall of panel Z. In such a quaternary connection, and in the last mentioned ternary connection, the plate 22 of the element C is received in the enlarged orifice of the bore which holds the element A so that the several panels are held in tightly fitting abutting engagement when proper standards of workmanship are maintained.

The several connections described hereinbefore may be disassembled again without the use of tools by following a sequence of steps substantially reversing the assembly steps.

A binary edge-to-edge connection may be established between two panels in a common plane when the panels are equipped with connecting elements A and C, and the element A is not fully driven home in its bore until after insertion of the element C. Engagement of the plate 22 with the enlarged orifice of the bore holding the element A prevents movement of the element C away from its locking position in which the axes of the cylindrical portions of the elements A and C coincide.

The last-mentioned connection is not readily disconnected unless the orifice of the bore holding the element A is of sufficient size to permit shifting of the element C away from its locking position.

The illustrated embodiments of the elements A, C and D are unitary metal members which may be produced by diecasting or in any other desired manner. The illustrated element B is preferably produced by injection molding of the plastic body 11 while the insert 12 is held in the mold in a conventional manner. Each of the several connecting elements, however, may be made entirely of plastics molded by conventional methods, or of combinations of metal and plastic in a manner exemplified by element B which itself may also be diecast or otherwise made of metal or plastic as a unitary body.

It should be understood, of course, that the foregoing disclosure relates only to a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:

1. In an arrangement for connecting furniture panels and the like, a tubular connecting member having an axis and comprising, in combination:

(a) an axially extending wall defining a substantially cylindrical cavity therein;

(b) a substantially circular end wall extending inwardly from the axially extending wall and bounding one end of the cavity,
  (1) the end wall defining two substantially diametrical slots intersecting each other and each having a width less than the diameter of the cavity,
  (2) diametrically opposite portions of the axially extending wall constituting a pair of end walls for one of said slots,
  (3) the axially extending wall defining a pair of axially extending slots in a common axially extending plane with the other one of said diametrical slots, the axially extending slots communicating with end portions of the other diametrical slot, two axially extending walls and a radially extending, transverse wall connecting the two axially extending walls remote from the other diametrical slot defining each axially extending slot; and
(c) an anchoring means on the tubular connecting member for retaining the same in a conforming bore in one of said furniture panels.

2. In an arrangement for connecting furniture panels and the like, the combination of
(a) a first connecting member consisting of a substantially cylindrical tubular member having an axis,
  (1) an axially extending wall defining a substantially cylindrical cavity therein,
  (2) a substantially circular end wall extending inwardly from the axially extending wall and bounding the cavity, the end wall being formed with two substantially diametrical slots intersecting each other, and having inner and outer radially extending faces adjacent the diametrical slots, one of the slots having transverse end walls at the ends thereof,
  (3) the axially extending wall of the tubular member defining two axial slots communicating with and extending in a common axial plane with respective end portions of the other diametrical slot, each axial slot having two axial walls and a transverse wall connecting portions of said axial walls remote from said other diametrical slot, and
  (4) anchoring means on the tubular connecting member for retaining the same in a conforming bore in one of said furniture panels;
(b) a second connecting member having a body portion adapted to be retained in another one of said furniture panels, said body portion having
  (5) a hook-shaped free end portion dimensioned for simultaneously conforming engagement with said axial walls and said transverse wall of one of said axial slots while a part of said end portion extends into said cavity and said body portion is outside said tubular member; and
(c) locking means simultaneously engageable with said first connecting member and said second connecting member for securing the connecting members in a fixed spatial relationship.

3. In an arrangement as set forth in claim 2, said locking means including a cover member having a plate portion, a cross bar portion, and a stem portion spacedly connecting said plate and cross bar portions, the spacing of said plate and cross bar portions being substantially equal to the spacing of said faces of the circular end wall of said first connecting member, and said stem and cross bar portions being dimensioned for passage through said one diametrical slot into a position in which said plate portion abuts against said outer face, said stem portion is rotatably received in one of said diametrical slots, and said cross bar is in said cavity.

4. In an arrangement as set forth in claim 2, said locking means including a third connecting member having a body portion, a plate portion on said body portion adapted abuttingly to engage said outer face of the end wall of said first connecting member, wing means spacedly secured to said plate member and dimensioned for passage through one of said diametrical slots into said cavity in one radial position of said third connecting member relative to the axis of said tubular member, and for locking engagement with said inner face of the end wall in another radial position of said third connecting member while said plate portion abuttingly engages said outer face.

5. In an arrangement as set forth in claim 4, barb means on the body portions of said second and third connecting members for retaining the same in respective conforming bores.

6. In an arrangement for connecting furniture panels and the like, the combination of
(a) a first connecting member consisting of a substantially cylindrical tubular member having an axis,
  (1) an axially extending wall defining a substantially cylindrical cavity therein,
  (2) a substantially circular end wall extending inwardly from the axially extending wall and bounding the cavity, the end wall being formed with two substantially diametrical slots intersecting each other, and having inner and outer radially extending faces adjacent the diametrical slots, one of the slots having transverse end walls at the ends thereof,
  (3) the axially extending wall of the tubular member defining two axial slots communicating with and extending in a common axial plane with respective end portions of the other diametrical slot, each axial slot having two axial walls and a transverse wall connecting portions of said axial walls remote from said other diametrical slot, and
  (4) anchoring means on the tubular connecting member for retaining the same in a conforming bore in one of said furniture panels; and
(b) another connecting member having
  (5) a body portion adapted to be retained in another one of said furniture panels,
  (6) a plate portion on said body portion adapted abuttingly to engage the outer face of the end wall of the first connecting member,
  (7) engaging means axially projecting from the plate portion, said engaging means including a bar having a wing on each side, the bar being dimensioned for passage through said one diametrical slot and for movement longitudinally of said slot in a radial direction, and said wings being dimensioned for passage through the other diametrical slot while the rib portion passes through the one slot, the wings being spaced from the plate portion a distance substantially equal to the thickness of the end wall of the first connecting member, whereby the two wings engage the inner face of the end wall and the plate portion engages the outer face of the end wall to lock the end wall therebetween when the bar and the wings are moved radially along the one slot.

References Cited
UNITED STATES PATENTS

| | | | |
|---|---|---|---|
| 42,994 | 5/1864 | Sellers | 287—20.92 |
| 314,075 | 3/1885 | Staunton | 85—1 |
| 2,421,305 | 5/1947 | Wachsmann | 287—20.92 |
| 2,851,748 | 9/1958 | Ettema | 287—20.92 |

JOHN E. MURTAGH, *Primary Examiner.*

FRANK L. ABBOTT, *Examiner.*

R. A. STENZEL, *Assistant Examiner.*